United States Patent
Greatwood

[19]

[11] Patent Number: 5,926,048
[45] Date of Patent: Jul. 20, 1999

[54] METHOD AND APPARATUS FOR SYNCHRONIZING CLOCK SIGNALS

[75] Inventor: Duncan McDougall Greatwood, London, United Kingdom

[73] Assignee: Madge Networks Limited, Buckinghamshire, United Kingdom

[21] Appl. No.: 08/823,584

[22] Filed: Mar. 25, 1997

[30] Foreign Application Priority Data

Apr. 1, 1996 [GB] United Kingdom .................... 9606864

[51] Int. Cl.⁶ ........................................................ H03L 7/00
[52] U.S. Cl. ............................................. 327/160; 377/39
[58] Field of Search ............................. 327/48, 141, 151, 327/160; 365/233, 236, 230.03, 230.08; 331/17; 377/39, 66, 78, 80

[56] References Cited

U.S. PATENT DOCUMENTS

| | | | |
|---|---|---|---|
| 4,171,538 | 10/1979 | Sheller | 364/900 |
| 4,280,099 | 7/1981 | Rattlingourd | 327/160 |
| 5,442,310 | 8/1995 | Bazes | 327/160 |
| 5,459,435 | 10/1995 | Taki | 327/160 |
| 5,506,809 | 4/1996 | Csoppenszky et al. | 365/221 |
| 5,594,763 | 1/1997 | Nimishakavi | 327/160 |

*Primary Examiner*—My-Trang Nu Ton
*Attorney, Agent, or Firm*—Sughrue, Mion, Zinn, Macpeak & Seas, PLLC

[57] ABSTRACT

A method and apparatus for synchronizing clock signals on first and second logic blocks connected via an asynchronous bus, wherein the second logic block includes a clock signal generator. The method comprises causing the clock signal on the first logic block to increment a first count; causing the clock signal on the second logic block to increment a second count; comparing the first and second counts; and adjusting the clock signal on the second logic block in response to the result of the comparison to synchronize the two clock signals, wherein the transfer of information between the logic blocks is carried out via the asynchronous bus.

13 Claims, 2 Drawing Sheets

METHOD AND APPARATUS FOR SYNCHRONIZING CLOCK SIGNALS

FIELD OF THE INVENTION

The invention relates to methods and apparatus for synchronizing clock signals on first and second logic blocks connected by an asynchronous bus wherein the second logic block includes a clock signal generator responsive to an input synchronizing signal to generate a clock signal synchronized with the synchronizing signal.

The invention has application in a variety of fields but is particularly suited to applications in which the logic blocks are incorporated in a PC linked to an external telephone system, for example for providing digital voice links to the telephone system.

DESCRIPTION OF THE PRIOR ART

The basic operation of digital voice links within a telephone system relies on parts of the telephone network operating with a common clock reference signal (typically based around 8kHz). For example the local telephone exchanges at each end of a conventional telephone call will both use the same clock reference signal to ensure that voice signals converted from analogue to digital form at one exchange are converted back from digital to analogue form at the same rate. Therefore there is no over-run or under-run of digitized voice signals within the digital part of the phone network.

With the advent of digital services such as ISDN it is practical and desirable for the digital phone system to be extended to the user, rather than converting voice signals from analogue to digital form at the first telephone exchange.

By connecting personal computers to the digital telephone network users can make use of the network directly for voice, data and video conferencing. However for correct operation the timing reference signals must still be propagated within the PC to any devices generating or processing data for the digital telephone network. This invention provides inter alia a novel way of maintaining such timing within a PC.

Typically the communications within a personal computer for video conferencing is broken into two modules or logic blocks plugged into the ISA bus (or other standard PC bus). An ISDN network interface on a first card (defining a first logic block) recovers the serial bit stream from the public network. This bit stream then crosses a synchronous interface provided by a ribbon cable (i.e. not via the personal computer asynchronous bus) to a second card (defining a second logic block) that processes the received bit stream for display and compresses the camera input to be passed back along the synchronous interface to the ISDN link.

The synchronous link undertakes two basic functions:

1. Passing the transmit and receive data between the two cards (in this case about 16Kbytes/sec in each direction).

2. Propagating the timing reference from the public phone network, via the ISDN interface to synchronize the operation of the video codec.

The main problem with this known technique is the requirement for an additional cable to provide a synchronous link between the two cards. This leads to additional mechanical complexity and additional cost.

One approach to solving this problem is described in U.S. patent application No. 08/813,433, entitled "Methods and Apparatus for Synchronising a Clock" filed on Mar. 10, 1997 in the names D. M. Greatwood and P. G. Claridge and commonly assigned to Madge Networks Limited. Another approach would be to use the clock signal utilized by the first logic block to reset a counter which is supplied with a high frequency signal from a separate oscillator. If a similar oscillator is held on the second logic block then a count can be transferred from one block to the other and used to synchronize the generation of a clock signal on the second logic block. The drawback of this approach is that the two crystal oscillators need to generate the same frequency to a high degree of accuracy.

SUMMARY OF THE INVENTION

In accordance with a first aspect of the present invention, a method of synchronizing clock signals on first and second logic blocks connected via an asynchronous bus, wherein the second logic block includes a clock signal generator comprises causing the clock signal on the first logic block to increment a first count; causing the clock signal on the second logic block to increment a second count; comparing the first and second counts; and adjusting if the clock signal on the second logic block in response to the result of the comparison to synchronize the two clock signals, wherein the transfer of information between the logic blocks is carried out via the asynchronous bus.

In accordance with a second aspect of the present invention, apparatus for synchronizing clock signals on first and second logic blocks connected via an asynchronous bus wherein the second logic block includes a clock signal generator comprises a first counter incremented by the clock signal on the first logic block to generate a first count value; a second counter incremented by the clock signal on the second logic block to generate a second count value; comparison means for comparing the first and second counts and for generating a synchronizing signal to which the clock generator on the second logic block responds to synchronize the clock signal generated by the clock generator with the clock signal on the first logic block; and means for transferring information relating to one or both of the counts across the asynchronous bus.

We have devised a new method and apparatus for synchronising the clock on the second logic block with the clock on the first logic block which does not require the use of additional cable, all information being transferred across the asynchronous bus. This is achieved by incrementing respective counts under control of the clock signals, comparing the counts, and adjusting the clock signal on the second logic block as necessary to achieve synchronisation.

It should be understood that the use of the term "increment" includes both positive and negative increments.

In a simple case, the two count, values are compared to see whether they are the same and if not the clock signal on the second logic block is adjusted to reduce the difference between the two count signals.

In some cases, the clock signals can directly increment the respective counts but often the rate of increment will be too low to achieve accurate synchronisation. In these cases, the clock signals are preferably multiplied, the multiplied clock signals causing the counts to be incremented.

Typically, the first counter will be provided on the first logic block and the second counter on the second logic block although this is not essential. In these cases, however, where the logic blocks are implemented as cards for insertion into a PC, the counts are provided at the "card edge" for transmission on the asynchronous bus.

Conveniently, the comparison means is provided on the second logic block but could be provided on the first logic block or by a host processor connected to the asynchronous bus.

The clock signal utilized by the first logic block can originate in any conventional manner. This could include an onboard oscillator but typically the clock is obtained from an external source such as a telephone network. The invention is particularly suited for handling a telephone call or video communication in which the first logic block is connected to a telephone network and the second logic block to a telephone or video input/output device.

BRIEF DESCRIPTION OF THE DRAWINGS

Some examples of methods and apparatus according to the invention will now be described with reference to the accompanying drawings, in which.

DETAILED DESCRIPTION OF THE EMBODIMENTS

Figure 1:
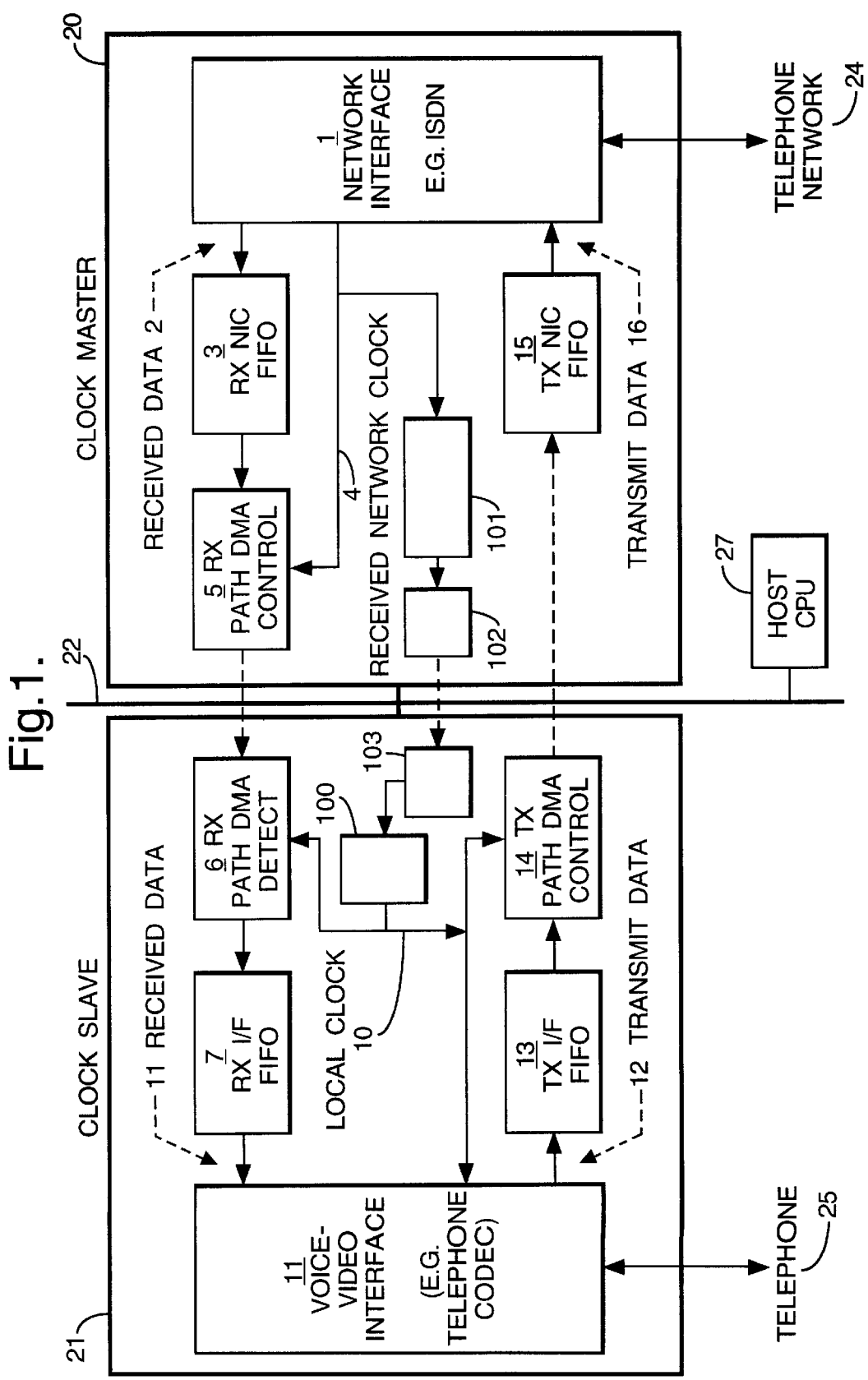
FIG. 1 is a block diagram of the apparatus.

In this example, a pair of PC adaptor cards 20,21; defining a "clock master" and a "clock slave" respectively are connected to the asynchronous bus 22 of a PC including a host CPU 27. The asynchronous bus also includes network transport systems. The clock master 20 is connected to a telephone network 24 which transfers data in accordance with a clock reference while the clock slave (in this example a codec for a local telephone handset 25 connected to the clock slave) receives and generates data synchronised with the clock master 20.

In FIG. 1, the clock master card 20 comprises a network interface 1 which connects the card to the telephone network 24. Data is received by the network interface 1 from the telephone network 24, in this example at 8000 bytes/sec. The received data 2 is passed byte by byte into a FIFO 3 through which it passes to a receive path DMA controller 5. A received network clock signal 4 generated by the network interface 1 from the incoming data is also passed to the controller 5.

The controller 5 then indicates to the host CPU 27 that it wishes to acquire the PC bus 22 for a DMA transfer (either in response to the network clock signal 4, or by sensing data arriving at the head of the FIFO 3, dependent on the implementation).

The received path DMA controller 5, once the bus 22 has been acquired, transfers a byte of data to the clock slave card 21 via the asynchronous bus 22. The arrival of the byte of data is detected by a receive path DMA detector 6 on the card 21, the data being passed to a receive FIFO 7 under the control of a local clock signal 10 generated by a generator 100. The local clock signal 10 is also fed to a voice-video interface circuit 11, in this case a telephone codec. This is connected with a telephone handset 25. The digital data in the FIFO 7 is converted to analogue form by the interface 11 and is fed to the telephone handset 25 under control of the local clock 10.

Data from the telephone handset 25 which is to be transmitted back to the telephone network 24 is first digitized by the interface 11 and is then fed 12 to a transmit interface FIFO 13. A transmit path DMA controller 14 is provided on the card 21 which, when data is to be sent, acquires the PC bus 22 and following acquisition transfers data from the FIFO 13 across the bus to a transmit FIFO 15 on the card 20. This transfer is under the control of the local clock 10. The FIFO 15 then transfers the data 16 to the interface I for onward transmission on the telephone network 24.

The rate at which data is transferred across the asynchronous bus does not have to be equal to the incoming clock signal frequency. It can be an integer or fraction multiple of the incoming clock signal. In the example system above the data stream was byte based, with byte transfers across the bus. In practice it will be desirable to provide some additional buffering within the FIFOs 3,7,13 and 15 to transfer larger bursts across the bus. For example transfers across the bus might be in long-word (4 byte) transfers. In this case the receive path DMA controller 5 would only trigger a transfer when 4 bytes of data were awaiting transfer (or every four clock cycles of the received network clock 4).

Suitable buses 22 can be the ISA, EISA, IBM micro channel, and PCI buses each of which have sufficient bandwidth to carry the required data traffic load. For example, an ISA bus can carry 2.5Mbytes/second.

In order to synchronize the local clock 10 on the card 21 with the clock 4 on the card 20, a clock processor 101 is provided on the card 20.

Figure 2:
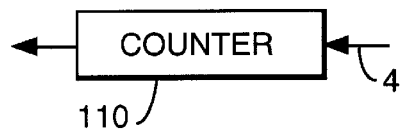
FIG. 2 illustrates a first example of a clock signal processor on the first logic block.

FIG. 2 illustrates a first example of the clock signal processor 101 on the card 20. This processor comprises a simple counter 110 to which the clock signal 4 derived from the ISDN input is fed. This clock signal increments the count from the counter 110 which is fed to a DMA controller 102.

Figure 3:
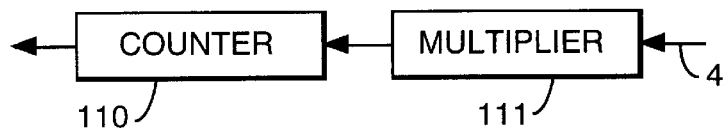
FIG. 3 illustrates a second example of a clock signal processor on the first logic block.

FIG. 3 illustrates a second example in which the first example is modified by inserting a multiplier 111 between the counter 110 and the incoming clock signal 4. This results in the count being incremented more quickly than the clock frequency which leads to more accurate synchronisation of the clock on the second logic block.

Figure 4:
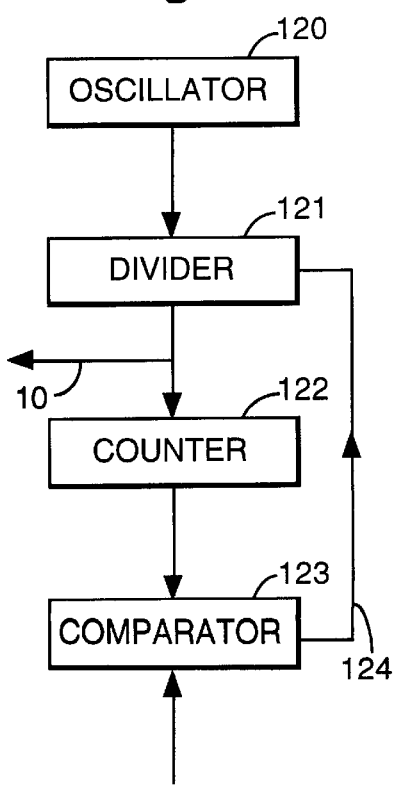
FIG. 4 illustrates a first example of a clock signal generator on the second logic block; and, FIG. 5 illustrates a second example of a clock signal generator on the second logic block.

FIG. 4 illustrates a first example of the clock signal generator 100 on the slave card 21. A high frequency crystal oscillator 120 generates a high frequency output signal which is fed to a variable divider 121 whose output constitutes the local clock signal 10. This clock signal 10 is also fed to a counter 122 which is incremented on each clock pulse from the divider 121. The output of the counter 122 is fed to a comparator 123 which compares the incoming count value with a count value obtained from the first logic block via a receive DMA detector 103 and generates a control signal on a line 124 which is fed back to the variable divider 121 to modify the output clock signal 10. Modifications are chosen to synchronize the two clocks.

The clock signal generator 100 shown in FIG. 4 would be suitable for use with the clock signal processor 101 shown in FIG. 2.

Figure 5:
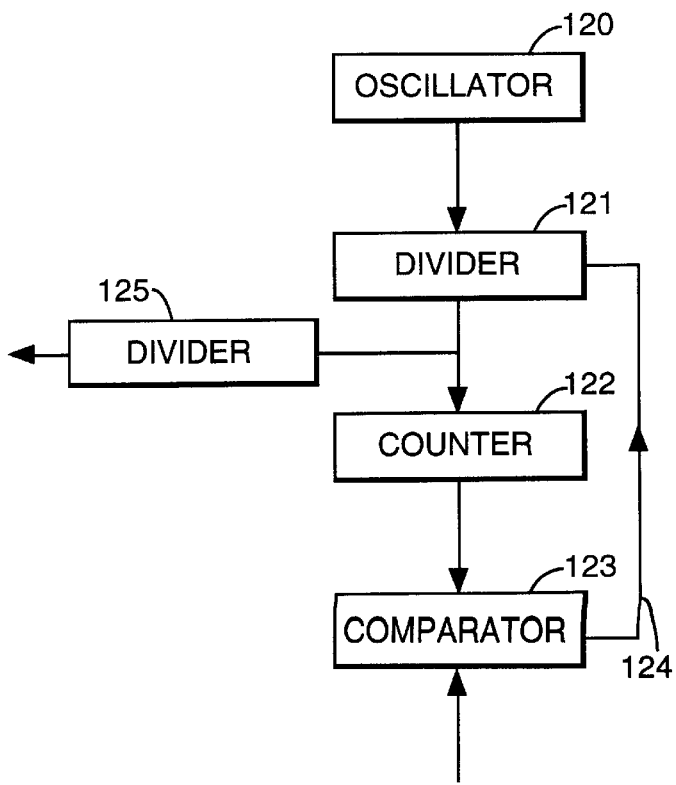

FIG. 5 illustrates a clock signal generator 100 for the card 21 which could be used with the clock signal processor 101 shown in FIG. 3. The generator 100 shown in FIG. 5 is similar to that shown in FIG. 4 except that an additional divider 125 is provided which divides the signal from the variable divider 121 by a factor equivalent to the multiplication factor of the multiplier 111. The operation of the FIG. 5 circuit is otherwise the same as the FIG. 4 circuit.

In each case, the counter will be reset at a convenient moment. For example, on power up or following a synchronisation step.

In operation, the DMA controller 102 on the card 20 interrupts the host processor 27 in order to transfer the current count value from the counter 110 across the asynchronous bus to the DMA detector 103 on the card 21 for comparison in the comparator 123. This transfer only needs to occur periodically, for example every 30 seconds, in order to maintain synchronization. If for any reason synchronisation is lost or for example on start-up then the second logic block will respond to the nominal output frequency of its onboard clock generator.

In the example described above, data transfers in each direction between the clock master 20 and clock slave 21 occur directly across the bus 22. In some cases, however, it is more convenient to effect these transfers via one or more host buffers in the PC. In this case, the controller 5 (or controller 102) transfers data to a host buffer and then sends an interrupt to the host CPU 27 which then copies data in the buffer to the clock slave 21. Alternatively, the interrupt could be sent before data is transferred to the buffer.

It should be understood that although the components on the clock master 20 and clock slave 21 are shown as individual elements, in practice they can be implemented in software, each card 20,21 including a suitably programmed microprocessor to simulate the components.

I claim:

1. A method of synchronizing clock signals on first and second logic blocks connected via an asynchronous bus, wherein the first logic block operates in accordance with a first clock signal, and wherein said second logic block includes a clock signal generator which generates a second clock signal, the method comprising causing the first clock signal on said first logic block to increment a first count; causing the second clock signal on said second logic block to increment a second count; comparing said first and second counts; and adjusting the second clock signal on said second logic block in response to the result of the comparison to synchronize the first and second clock signals, wherein the transfer of information between said logic blocks is carried out via said asynchronous bus.

2. A method according to claim 1, wherein the second clock signal on said second logic block is adjusted to minimise any difference between the first and second counts.

3. A method according to claim 1, further comprising multiplying the first clock signal on said first logic block prior to incrementing the first count.

4. A method according to claim 1, wherein said first logic block is connected to an external clock signal source which generates an external clock signal, the method causing said clock signal generator to be synchronized with the external clock signal.

5. Apparatus for synchronizing clock signals on first and second logic blocks connected via an asynchronous bus, wherein the first logic block operates in accordance with a first clock signal, and wherein said second logic block includes a clock signal generator which generates a second clock signal, the apparatus comprising a first counter incremented by the first clock signal on said first logic block to generate a first count value; a second counter incremented by the second clock signal on said second logic block to generate a second count value; a comparator for comparing the first and second counts and for generating a synchronizing signal to which said clock signal generator on said second logic block responds to synchronize the second clock signal generated by said clock signal generator with the first clock signal on said first logic block; and a transfer mechanism for transferring information relating to one or both of the counts across said asynchronous bus.

6. Apparatus according to claim 5, wherein the synchronizing signal generated by said comparator represents a difference between the first and second counts.

7. Apparatus according to claim 5, wherein the first clock signal directly increments said first counter.

8. Apparatus according to claim 5, further comprising a multiplier to which the first clock signal is fed, the output of said multiplier being fed to said first counter.

9. Apparatus according to claim 5, wherein said first counter is provided on said first logic block and said second counter on said second logic block.

10. Apparatus according to claim 5, wherein said comparator is provided on said second logic block.

11. Apparatus according to claim 5, further comprising an oscillator for generating the second clock signal which is fed to said second counter.

12. Apparatus according to claim 11, wherein a variable divider is positioned between said oscillator and said second counter, said variable divider being responsive to the synchronizing signal to adjust the second clock signal.

13. Apparatus according to claim 12, further comprising a second divider to which the output of said variable divider is fed in parallel to said second counter, the output of said second divider constituting the second clock signal.

* * * * *